United States Patent Office 3,179,503
Patented Apr. 20, 1965

3,179,503
EXTRACTION OF CESIUM FROM AQUEOUS
SOLUTION USING PHENOLS
Donald E. Horner, Clinton, and David J. Crouse, Jr., and Keith B. Brown, Oak Ridge, Tenn., assignors to the United States of America as represented by the United States Atomic Energy Commission
No Drawing. Filed Sept. 24, 1962, Ser. No. 225,936
9 Claims. (Cl. 23—312)

This invention relates to a solvent extraction process for the separation and recovery of cesium values from basic aqueous solutions. More particularly, it is concerned with the separation of cesium-137, along with other cesium isotopes, from an aqueous solution containing the same together with nuclear fission products as well as to the separation of cesium from solutions obtained in the treatment of cesium-containing ores.

In the processing of neutron-irradiated nuclear fuel by solvent extraction from aqueous solution, large volumes of fission product aqueous waste solutions are produced which contain sufficient amounts of certain valuable fission products to warrant their recovery. In particular, the gamma-emitting cesium-137 isotope, continues to find expanded utility as a multi-curie source useful for the irradiation of foods, chemicals and for radiotherapeutic purposes. Also, demand for natural cesium (derived from ores) is rapidly increasing as new uses for this element are found. Of important interest is its use in rocket engines as an ion propulsion source.

The principal problem in recovering cesium from solution is to effect an efficient separation from other metals, particularly other alkali metals, contained therein. Presently known cesium recovery methods include precipitation and use of solid ion exchangers. Precipitation procedures are usually relatively inefficient and particularly when applied to radioactive solutions, are cumbersome and difficult to exploit on a large scale. Solid ion exchangers have the disadvantage of being difficult to transport and therefore not readily adaptable to continuous processing methods. Liquid extraction reagents, on the other hand, are readily pumped and amenable for use in large-scale continuous countercurrent recovery processes. What is needed is, and it is a principal object of this invention to provide, a simple, continuous, practical process for separating cesium values from a highly radioactive aqueous waste solution on a large-scale production basis. A general object of this invention is to provide a solvent extraction process for separating cesium from a cesium-containing aqueous solution. A further object of this invention is to separate cesium from other alkali metals and alkaline earth metals. A further object of this invention is to separate cesium-137 from a solution-containing source which also includes the principal radio-isotopes produced from nuclear fission. Still another object of this invention is to provide a method for the separation of cesium values from a fission-product waste solution resulting from processing of neutron-irradiated nuclear fuels. Other objects and advantages of this invention will become apparent from the ensuing description.

The basis of this invention lies in the discovery that a selected class of substituted phenols possess a unique combination of desirable properties which make them useful in selectively extracting cesium values from an aqueous basic solution. These phenols when dissolved in an organic diluent provide a liquid organic phase which permits the formation of a continuous liquid-liquid solvent extraction process for the selective separation of cesium values into the organic phase as a soluble cesium phenolate species. We have found that when a suitably substituted phenol of the class, hereinafter defined, is dissolved in an organic diluent and contacted with a cesium-containing aqueous basic solution, the cesium will transfer to the organic phase, giving an effective separation from any other constitutents in the solution. For example, in the case where the aqueous solution to be treated is a highly radioactive waste solution derived from the processing of nuclear fuels, a cesium-containing product solution concentrated in cesium will be obtained, virtually free of other radioactive species and other metal contaminants. In the case where the solution to be treated is derived from the processing of cesium-containing ores, a highly purified cesium-containing organic extract will be obtained, effectively free of other alkali metals or alkaline earth metals. The efficiency of the separation is improved by scrubbing the cesium-containing organic extract with dilute base. The organic extract is readily stripped of its cesium values and the selected phenol-diluent rendered suitable for recycle by contact with a dilute acid solution. The purified cesium is then recoverable by evaporation of the strip solution or by other known methods.

The phenols which have been discovered to have the unique combination of properties which make them useful as selective extractants for cesium are selected from the group consisting of an ortho phenyl phenol, an ortho benzyl phenol and a para alkyl substituted phenol wherein the alkyl substituent contains from 9–20 carbon atoms. Para alkyl substituted phenols such as 2-chloro-4-cyclohexyl phenol have also been found suitable as selective phenol extractants.

For use as a cesium extractant, the selected phenol is dissolved in an organic diluent, preferably of high flash point, which is substantially immiscible with aqueous solutions. The organic diluent is chosen from those which will not adversely influence the phenol extraction power, as measured by the extraction coefficient and should not form permanent emulsions on contact with aqueous basic cesium-containing solutions. The organic solvent diluents which meet these requirements may be selected from nitrobenzene, xylene, toluene, high flash point dialkyl benzenes, such as diethylbenzene and diisopropylbenzene; and mixtures of an aliphatic petroleum product (as for example, the trademarked product known as "Amsco 125–82") with a long-chain alcohol such as tridecanol.

The cesium extraction coefficient is a measure of the efficiency with which cesium can be extracted, higher coefficients denoting more efficient extraction. This coefficient increases with increase in solvent phenol concentration and therefore it is of advantage to extract with solvent containing as high a phenol concentration as is consistent with good physical performance. We have found that cesium extraction is usually impractically weak below about 0.5 M phenol concentration and that above a 2 M phenol concentration there is a tendency toward emulsion formation in contacting aqueous basic cesium feed solutions with the phenol-containing organic phase.

The magnitude of the extraction coefficient has been found to increase with increase in alkalinity (i.e., pH) of the aqueous cesium-containing feed solution, although there is an upper limit in using some phenols above which the alkalinity cannot be raised without suffering loss of cesium extraction power owing to excessive loss of the phenol extractant from the organic phase. In contacting highly alkaline feeds, we have found that appreciable quantities of phenol may be transferred from the organic to the aqueous phase with an accompanying decrease in aqueous pH. However, as will be clearly demonstrated in Example III below, loss of phenol extractant to the aqueous phase may be efficiently overcome by adding acid to the aqueous raffinate or to the last extraction stage and then recycling the resultant free phenol back to the organic phase.

The cesium can be easily recovered from the organic phase by contacting it with dilute acid. Nitric acid has been used most extensively but other acids such as hydrochloric and sulfuric as well as organic acids such as acetic, citric, etc. are also highly effective. By stripping at a high organic/aqueous ratio, the cesium can be highly concentrated across the stripping cycle. Stripping is highly effective, provided sufficient acid is used so that the aqueous strip solution, after contact with the cesium laden solvent, has a pH of 7 or below.

The permissible and practical range of parameters which define and permit the operation of a simple, practical and at least semi-continuous, liquid-liquid extraction process utilizing the class of phenols as previously defined for selectively and quantitatively removing cesium values from an aqueous basic solution containing said values, will now be illustrated in the following examples.

EXAMPLE I

This example demonstrates the effect of phenol concentration in the organic phase on the cesium extraction coefficient.

Various concentrations of paradodecylphenol were dissolved in diisopropylbenzene diluent to form solutions ranging from 0.5 to 2 molar. These solutions were used to extract cesium from a $10^{-4}$ molar cesium nitrate—0.01 molar sodium hydroxide solution spiked with cesium-134 tracer. The results are summarized in Table I.

Table I

Organic: 0.5 M-2 M paradodecylphenol dissolved in diisopropylbenzene
Aqueous: 0.01 M NaOH, 0.0001 M/CsNO₃ spiked with Cs-134
Final pH=11.7-11.8
Phase ratio: 1/1

| Molarity Cs Extractant | $E_a^o$(Cs Ext. Coeff.) |
|---|---|
| 0.5 | 0.3 |
| 1.0 | 1.8 |
| 1.2 | 3.5 |
| 1.5 | 6.5 |
| 2 | 14 |

The striking increase in the cesium extraction coefficient indicates at least a third power dependency of the extraction coefficient on the phenol concentration and points up the importance of using as high a phenol concentration consistent with the physical requirements of solvent extraction, such as avoidance of an emulsion formation.

EXAMPLE II

This example illustrates the capacity of the selected phenol of this invention to efficiently separate cesium from other alkali metals such as sodium, potassium, lithium and rubidium and each from the other.

Aqueous solutions of 1 molar sodium nitrate, potassium nitrate, lithium nitrate and rubidium nitrate each containing 0.3 gram cesium/liter spiked with cesium-134 tracer were prepared and adjusted to the initial pH indicated in Table II with the corresponding alkali metal hydroxide. Each of these solutions was then contacted in a batch-wise manner with an equal volume of a 1 molar solution of paradodecylphenol in xylene. The results are summarized in Table II below.

Table II

| System | Initial OH Conc. | Final | Ext. Coeff. $E_a^o$ | | Sep. Factor, Cs./M |
|---|---|---|---|---|---|
| | | | Cs. | M=Na, Li, K, or Rb | |
| NaOH₃—NaOH | 0.01 | 11.1 | 0.20 | 0.0018 | 110 |
| | .02 | 11.3 | 0.45 | 0.0045 | 100 |
| | .05 | 11.7 | 1.0 | 0.016 | 62 |
| | 0.10 | 11.9 | 1.4 | 0.051 | 28 |
| | 0.20 | 12.1 | 1.8 | 0.11 | 16 |
| LiNO₃—LiOH | .01 | 10.7 | 0.17 | 0.0026 | 65 |
| | .02 | 11.0 | 0.38 | 0.0062 | 61 |
| | .05 | 11.1 | 0.95 | 0.019 | 50 |
| | 0.10 | 11.2 | 1.5 | 0.044 | 34 |
| | 0.20 | 11.3 | 2.0 | 0.11 | 18 |
| KNO₃—KOH | 0.01 | 11.0 | 0.10 | 0.0026 | 39 |
| | .02 | 11.4 | 0.23 | 0.0085 | 27 |
| | .05 | 11.8 | 0.55 | 0.023 | 24 |
| | 0.10 | 12.1 | 0.90 | 0.045 | 20 |
| | 0.20 | 12.5 | 1.3 | 0.091 | 14 |
| RbNO₃—RbOH | 0.01 | 10.5 | 0.019 | 0.0013 | 15 |
| | 0.02 | 11.0 | 0.064 | 0.006 | 11 |
| | 0.05 | 11.7 | 0.206 | 0.025 | 8.2 |
| | 0.10 | 12.1 | 0.388 | 0.056 | 7.0 |
| | 0.20 | 12.7 | 0.608 | 0.095 | 6.4 |
| | 0.40 | 13.3 | 0.72 | 0.136 | 5.3 |
| | 0.60 | 13.6 | 0.70 | 0.148 | 4.7 |

Since the cesium extraction coefficient is significantly different from any of the other alkali metals, a cleancut separation of cesium from the other in a multi-stage, preferably continuous, countercurrent solvent extraction arrangement can be readily achieved. The same general pattern of results has been found with the other phenols of the defined class.

EXAMPLE III

This example illustrates an extremely useful technique of operating a cesium extraction process at a high cesium extraction coefficient while at the same time conserving losses of the phenol extractant to the aqueous phase. As previously mentioned, while contacting of highly alkaline cesium-containing solutions with a selected phenol extractant results in an increased cesium extraction coefficient, there is an upper limit in pH beyond which cesium extraction actually decreases due to excessive losses of the phenol extractant to the aqueous raffinate phase. The loss of the phenol extractant to the aqueous raffinate is apparently due to the aqueous solubility of the alkali metal phenolates, which may be formed concurrently with the organic soluble cesium phenolate. The formation of alkali phenolates results in a relatively large decrease in pH of the aqueous raffinate resulting, in turn, in a decrease of the cesium extraction coefficient. The aforementioned deleterious loss of phenol and reduction in cesium extraction coefficient is illustrated in the case of orthophenyl phenol. Table III below summarizes the results of extracting an aqueous phase comprising a simulated fission product (including Cs) waste solution of the kind resulting from the processing of neutron irradiated nuclear fuels, with a 1 M solution of orthophenyl phenol dissolved in diisopropylbenzene. The waste solutions are normally highly acidic and are commonly neutralized by addition of sodium hydroxide.

Table III

Organic: 1 M orthophenyl phenol in diisopropylbenzene
Aqueous: simulated fission product solution adjusted to indicated pH
Phase ratio: 1/1

| pH | | OPP Concentration [1] in Aqueous, M |
|---|---|---|
| Initial | Final | |
| 4.3 | 4.3 | 0.002 |
| 6.4 | 6.4 | 0.002 |
| 7.3 | 7.0 | 0.002 |
| 10.2 | 9.8 | 0.002 |
| 11.5 | 11.0 | 0.011 |
| 13.0 | 12.4 | 0.27 |
| 13.2 | 12.6 | 0.43 |
| 13.4 | 12.8 | 0.59 |
| 13.6 | 13.0 | 0.67 |

[1] Determined by bromination of OPP after extraction with $CHCl_3$; reacted bromine determined by difference with KI and titration of equivalent iodine.

It will be noted that the loss of phenol extractant to the aqueous raffinate was negligible at a final pH below about 10 and small at final pH 11, but became very high thereafter. For example, on extracting the aqueous feed at an initial pH of 13.6 sodium at volume phase ratio of 1:1, the concentration of the cesium extract in the aqueous phase was 0.67 molar, corresponding to a loss of 67% of the total phenol from the organic phase. It is clear that such losses of the phenol extractant could not be tolerated in any practical and economical cesium separation process. However, the high losses of phenol extractant may be effectively countered and overcome by adding acid to the aqueous raffinate or to the last extraction stage of an extraction system to convert the sodium or other aqueous soluble phenolate to the free phenol and then recycling the free phenol to the organic phase. Thus, continuous regeneration of the phenol will not only prevent phenol losses, but will also permit full advantage to be taken of the high cesium extraction factors achievable with maximum phenol concentration in the organic phase. A similar pattern of extractant loss to the aqueous phase and consequent reduction in the cesium extraction coefficient has been found with the other useful extractants, the amount of loss being dependent on the particular phenol. Thus, the behavior of 4-chloro-2-phenyl phenol is similar to orthophenyl phenol. In marked contrast, loss of 4-sec-butyl-2 (α-methylbenzyl) phenol is small (about 0.05 gram per liter of aqueous contacted) even at pH 13, and there is little pH change in the contacted aqueous phase. However, the practice of regeneration of the free phenol by acidifying the aqueous raffinate or by addition of acid to the last extraction stage in a countercurrent extraction system may still be desirable as a matter of standard practice where adverse losses of the selected phenol extractant are encountered.

EXAMPLE IV

The separation of cesium from contaminants by solvent extraction can be increased to an even higher level by scrubbing the cesium-containing organic phase with caustic at a concentration in the range 0.01 to 0.5 molar. Since scrubbing also removes some of the cesium from the organic phase, the spent scrub solution should be recycled to the extraction stages. Choice of optimum caustic concentration for scrubbing depends upon the particular phenol. It is desirable to use as dilute a caustic solution as is possible without removing an excessive amount of cesium and thus minimize the amount of recycle. As seen from Table IV below, with orthophenyl phenol, the minimum caustic concentration is 0.2 to 0.3 M; a lower concentration results in excess cesium loss from the organic phase. With 4-chloro-2-phenyl phenol and 4-sec-butyl 2-(alpha methylbenzyl) phenol, 0.1 M NaOH and 0.01 M NaOH, respectively, are suitable for scrubbing.

Table IV

Organic: 1 M orthophenyl phenol in xylene containing Cs extracted from aqueous solution
Contact: 10 minutes, batch test
Phase volume ratio organic/aqueous=7:1
Scrub solution: as indicated

| NaOH, M | pH | | Cesium Ext. Coef. (O/A) |
|---|---|---|---|
| | Initial | Final | |
| 0.001 | 11.0 | 10.5 | 0.026 |
| 0.01 | 12.0 | 10.9 | 0.057 |
| 0.05 | 12.7 | 11.6 | 0.18 |
| 0.10 | 12.9 | 11.8 | 0.29 |
| 0.20 | 13.1 | 12.2 | 0.48 |
| 0.30 | 13.3 | 12.4 | 0.60 |
| 0.50 | 13.5 | 12.6 | 0.78 |

EXAMPLE V

Since a major object and advantage of this invention is to separate cesium from aqueous waste solution-containing products of nuclear fission, it is of interest to examine the behavior of the principal fission products found in such solutions. Accordingly, a synthetic feed solution was prepared by spiking an aqueous basic solution adjusted to the pH indicated in the following Table V with the principal isotopes normally found in such solutions, such as the rare earths, zirconium-niobium-95, strontium-85, and ruthenium-103. These solutions were contacted for 10 minutes with a 1 molar solution of paradodecylphenol in xylene at 1:1 phase ratio. The phases were separated and analyzed by isotopic tracer analysis and the results are summarized in Table V below.

Table V

| Isotope tracer | Initial pH | Final pH | Activity, counts/minute/ml. | | Extraction coefficient (organic/aqueous) |
|---|---|---|---|---|---|
| | | | Organic | Aqueous | |
| Eu-152* | 10.0 | 9.6 | (a) | $5.0 \times 10^5$ | $<2 \times 10^{-4}$ |
| | 11.0 | 10.7 | $1.4 \times 10^2$ | $5.1 \times 10^5$ | $3 \times 10^{-4}$ |
| | 12.0 | 11.0 | $1.2 \times 10^2$ | $5.1 \times 10^5$ | $2 \times 10^{-3}$ |
| | 13.2 | 12.8 | $1.0 \times 10^3$ | $5.2 \times 10^5$ | $2 \times 10^{-3}$ |
| Zr-Nb$^{95}$ | 10.0 | 9.7 | (a) | $1.4 \times 10^5$ | $<7 \times 10^{-4}$ |
| | 11.0 | 10.5 | (a) | $1.4 \times 10^5$ | $<7 \times 10^{-4}$ |
| | 12.0 | 11.2 | (a) | $1.4 \times 10^5$ | $<7 \times 10^{-4}$ |
| | 13.0 | 12.3 | $1.3 \times 10^2$ | $1.4 \times 10^5$ | $9 \times 10^{-4}$ |
| Sr-85 | 10.0 | 9.7 | (a) | $1.4 \times 10^5$ | $<7 \times 10^{-4}$ |
| | 11.0 | 10.7 | (a) | $1.4 \times 10^5$ | $<7 \times 10^{-4}$ |
| | 12.0 | 11.6 | (a) | $1.4 \times 10^5$ | $<7 \times 10^{-4}$ |
| | 13.0 | 12.7 | $9 \times 10^2$ | $1.5 \times 10^5$ | $6 \times 10^{-3}$ |
| Ru-103 | 10.0 | 9.8 | (a) | $7.4 \times 10^4$ | $<1.4 \times 10^{-3}$ |
| | 11.0 | 10.8 | (a) | $7.4 \times 10^4$ | $<1.4 \times 10^{-3}$ |
| | 12.0 | 11.7 | (a) | $7.4 \times 10^4$ | $<1.4 \times 10^{-3}$ |
| | 13.0 | 12.5 | (a) | $7.3 \times 10^4$ | $<1.4 \times 10^{-3}$ | a <100 counts/minute/milliliter.
*Eu-152, while not a principal fission product, provides a convenient representation of the rare earth fission products.

It will be seen that extraction of europium, zirconium-niobium, strontium and ruthenium from simulated aqueous waste solution at pH in the range 10–13 with paradodecyl phenol was virtually negligible. It is clear then from the results in Table V that a highly effective separation of cesium from these fission products can be achieved, considering that a relatively high cesium extraction coefficient in the approximate range 1.3 to 2 can be obtained with highly basic aqueous solutions.

EXAMPLE VI

One of the principal solvent extraction processes for separating and purifying uranium and plutonium from each other and from fission products contained in irradiated uranium fuel elements is the so-called "Purex" system. This process is described in a paper entitled "Symposium on Reprocessing of Irradiated Fuels," Book 1, pp. 83–129, which appears in TID-7534, a publication of the Technical Information Services Extension of the United States Atomic Energy Commission. The present invention is particularly suitable for use for recovering cesium from the highly acidic aqueous waste concentrate produced from the Purex process. For efficient extraction of cesium, the pH of the said raffinate is adjusted to a basic range. In addition, in order to prevent precipitation of certain metal cations, the solution is treated with a complexing agent such a tartrate, citrate and acetate in order to form aqueous soluble complex salts.

This example is designed to show the applicability of the process of this invention to selectively separate cesium values from a typical Purex aqueous waste volume containing cesium and other nuclear fission products. A tartrate-complexed simulated aqueous waste solution was adjusted to a pH of 12.8. This solution was then contacted countercurrently in a solvent extraction system containing 6 extraction stages and 2 scrub stages. An organic/aqueous ratio of 1:1 was used in the extraction stages and the cesium-loaded organic extract was scrubbed in two stages with 0.3 molar sodium hydroxide at an aqueous/organic ratio of 5:1. Regeneration of the aqueous soluble phenolates was effected by lowering the pH in the bottom (6th) extraction stage to minimize loss of the phenol extractant to the raffinate and maintain high extraction efficiency. Addition of acid to this stage converted the aqueous soluble phenolate salts dissolved in the aqueous phase to the free phenol which re-distributed back to the solvent. Analysis of the phenol concentration in the solvent from each stage showed that reflux of phenol was appreciable, the concentration in the solvent being from 11–17% higher in stages 2–6 than in the feed organic. Analysis for the phenol extractant in the raffinate showed less than 0.2% of the reagent was lost. A single contact of the scrubbed extract with 0.05 volume of 0.05 molar nitric acid stripped the cesium quantitatively therefrom, yielding an aqueous solution containing 2.4 grams of cesium/liter. The overall cesium to sodium decontamination factor (feed to stripped product) was 16,000 with a cesium recovery of over 98%. The results are summarized in Table VI below.

Table VI

Organic: 0.97 M orthophenyl phenol in di-isopropyl benzene.
Aqueous feed: Simulated Purex,[a] tartrate-complexed (two moles sodium tartrate/mole Fe); dilute 3-fold with caustic to pH 12.8; contained 0.12 g. Cs per liter and Cs-134 tracer.
Scrub: 0.3 M NaOH.
Acid (to 6th extraction stage): 3 M HNO$_3$.
Contact: 2 min.; batch countercurrent with organic/feed/scrub/acid ratios 1/1/0.2/0.12.

| Stage | Final pH | Cs Activity, counts/minutes/ml. | | Cesium extraction coefficient | Solvent phenol conc., M |
|---|---|---|---|---|---|
| | | Organic | Aqueous | | |
| Scrub: | | | | | |
| 2 | 11.4 | 1.75×10$^5$ | 8.33×10$^4$ | 2.1 | 0.96 |
| 1 | 11.4 | 1.89×10$^5$ | 7.61×10$^4$ | 2.5 | 1.00 |
| Aqueous feed | 12.8 | | 1.64×10$^5$ | | |
| Extraction: | | | | | |
| 1 | 12.1 | 1.88×10$^5$ | 9.92×10$^4$ | 1.9 | 1.02 |
| 2 | 12.1 | 1.17×10$^5$ | 4.21×10$^4$ | 2.8 | 1.17 |
| 3 | 12.1 | 5.13×10$^4$ | 1.93×10$^4$ | 2.7 | 1.15 |
| 4 | 12.1 | 2.03×10$^4$ | 7.72×10$^3$ | 2.6 | 1.11 |
| 5 | 12.1 | 6.61×10$^3$ | 2.61×10$^3$ | 2.5 | 1.12 |
| 6 | 8.8 | <100 | 2.51×10$^3$ | | 1.13 |

[a] The simulated Purex waste solution contained in moles per liter, 4.0 H+, 4.45 NO$_3$, 1.0 SO$_4$, 0.6 Na, 0.5 Fe, 0.1 Al, 0.005 U, 0.01 Ni, 0.01 Cr, 0.01 PO$_4$; and in grams per liter, 0.37 Cs, 0.6 Zr, 0.17 Sr, 0.47 Ce (III), 0.29 Ru, and 0.87 Sm.

EXAMPLE VII

This example illustrates the extraction efficiency of 4-chloro-2-phenyl phenol in selectively extracting cesium from a fission product waste feed solution. The test was conducted exactly as described in Example VI for orthophenyl phenol except that the aqueous feed was adjusted to pH 12.6 rather than pH 12.8. Operation at a lower hydroxide concentration was possible with 4-chloro-2-phenyl phenol since it is a more effective cesium extractant at lower pH levels than is orthophenyl phenol. A single contact of the scrubbed extract with 0.05 volume of 0.05 molar nitric acid quantitatively stripped the cesium, yielding a solution containing 2.5 grams/liter of cesium, amounting to a cesium recovery of 98.3%. The overall cesium/sodium decontamination factor was about 5000. The results are summarized in Table VII below.

Table VII

Organic: 1 M 4-chloro-2-phenyl phenol in DIPB
Aqueous feed: simulated Purex, tartrate-complexed; diluted 3-fold with caustic to pH 12.6; contained 0.12 g. Cs per liter and Cs-134 tracer
Scrub: 0.3 M NaOH
Acid (to 6th extraction stage): M HNO$_3$
Contact: 2 min.; batch countercurrent with organic/feed/scrub/acid ratios 1/1/0.2/0.08

| Stage | Final pH | Cs γ-activity (c./m./ml.) | | Cesium extraction coefficient |
|---|---|---|---|---|
| | | Organic | Aqueous | |
| Scrub: | | | | |
| 2 | 10.7 | 1.40×10$^5$ | 2.15×10$^4$ | 6.5 |
| 1 | 11.1 | 1.44×10$^5$ | 1.94×10$^4$ | 7.4 |
| Aqueous feed | 12.6 | | 1.39×10$^5$ | |
| Extraction: | | | | |
| 1 | 11.5 | 1.44×10$^5$ | 5.66×10$^4$ | 2.5 |
| 2 | 11.5 | 6.71×10$^4$ | 2.65×10$^4$ | 2.5 |
| 3 | 11.5 | 3.08×10$^4$ | 1.23×10$^4$ | 2.5 |
| 4 | 11.5 | 1.32×10$^4$ | 5.28×10$^3$ | 2.5 |
| 5 | 11.5 | 4.25×10$^3$ | 1.87×10$^3$ | 2.3 |
| 6 | 6.7 | <100 | 1.89×10$^3$ | |

EXAMPLE VIII

The strong cesium extraction power of 4-sec-butyl-2-(alpha-methylbenzyl) phenol was shown in a batch countercurrent system containing 5 extraction stages, using an organic/aqueous ratio of 1:1. Conditions were identical to those used in the test with 4-chloro-2-phenyl phenol as in Example VII. Stage-wise extraction coefficients with 4-sec-butyl-2(alpha methyl benzyl) phenol were 7–8 compared to 2.5 for 4-chloro-2-phenyl phenol (see Example VII) while scrub coefficients were about 33 compared to about 7 for 4-chloro-2-phenyl phenol. The relatively low reactivity of the alpha-methyl benzyl phenol with sodium, is evident from the pH data of Table VIII below. The pH in the extraction system (exclusive of the last stage where acid was added) was essentially the same as the feed solution, whereas there was an appreciable drop in pH in the extraction system in the previously described tests with ortho-phenyl phenol and 4-chloro-2-phenyl phenol. Because of this low reactivity, the reflux of the alpha methyl benzyl phenol at the bottom of the extraction system was small, the concentration of said latter phenol varying only by about 5% in the last extraction stage as compared to the first extraction stage. Nevertheless, even with this highly selective cesium extractant, regeneration of the smaller amounts of aqueous soluble phenolates in the aqueous raffinate is recommended to conserve the valuable phenol extractant. A summary of the results using 4-sec-butyl-2(alpha-methyl benzyl) phenol is given in Table VIII below.

Table VIII

Organic: 1 M 4-sec-butyl-2 (alpha-methylbenzyl) phenol in diisopropylbenzene
Aqueous feed: simulated Purex solution-tartrate-complexed (2 moles/mole Fe); diluted 3-fold with caustic to pH 12.6; contained 0.12 g. Cs per liter and Cs-134 tracer
Scrub: 0.3 M NaOH
Acid (to 5th extraction stage): 3 M $HNO_3$
Contact: 2 min.; batch countercurrent; organic/feed/scrub/acid=1/1/0.2/0.075

| Stage | Final pH | Cs γ-activity (c./m./ml.) | | Cesium extraction coefficient ($E_a^o$) |
|---|---|---|---|---|
| | | Organic | Aqueous | |
| Scrub: | | | | |
| 2 | | $1.78 \times 10^5$ | $5.55 \times 10^3$ | 32 |
| 1 | | $1.78 \times 10^5$ | $5.27 \times 10^3$ | 34 |
| Aqueous feed | 12.6 | | $1.76 \times 10^5$ | |
| Extraction: | | | | |
| 1 | 12.7 | $1.80 \times 10^5$ | $2.06 \times 10^4$ | 8.7 |
| 2 | 12.7 | $2.62 \times 10^4$ | $3.39 \times 10^3$ | 7.7 |
| 3 | 12.7 | $4.45 \times 10^3$ | $6.1 \times 10^2$ | 7.3 |
| 4 | 12.6 | $6 \times 10^2$ | $2 \times 10^2$ | 3.3 |
| 5 | 10.9 | 70 | $1.6 \times 10^2$ | |

The scrubbed extract from the batch countercurrent test was stripped of its cesium content with 0.05 molar nitric acid at an organic/aqueous ratio of 20:1 to yield a product solution containing greater than 99.8% of the cesium in the feed solution. The calculated overall cesium/sodium decontamination factor was greater than 6000.

EXAMPLE IX

This example demonstrates recovery and purification of natural cesium from mixed alkali metal carbonates. In recovering and purifying lithium from ores, a cesium-containing by-product, called Alkarb, is produced. A typical analysis of the Alkarb shows 37.9% K, 18.3% Rb, 2.0% Cs, 0.1% Li, <0.002% Ca, and 39.3% $CO_3$. A feed solution was prepared by dissolving 100 grams of Alkarb in water, adjusting the pH to 13.3 with caustic and diluting to one liter. The cesium concentration in the solution was 1.9 grams per liter. Cesium was extracted from this solution in four extraction stages using a 1 M solution of 4-sec-butyl-2(alpha-methylbenzyl) phenol in diisopropylbenzene at an organic/aqueous phase ratio of 1/2. The extract was scrubbed in 3 stages with one-half its volume of 0.01 M NaOH, the spent scrub solution being returned to the top extraction stage. The scrubbed extract, containing ~4 grams of cesium per liter was stripped >99.8% by a single contact with 0.5 M $HNO_3$ at an organic/aqueous phase ratio of 8.6/1 to give a product solution containing 39 grams of cesium per liter. The aqueous raffinate leaving the extraction section contained only 0.002 gram of cesium per liter showing that cesium recovery was >99.8%. Separation of cesium from the other alkali metals was highly efficient as shown by the data in Table IX below.

Table IX

| Ratio | Alkarb feed liquor | Strip product solution |
|---|---|---|
| Cesium/rubidium | 0.105 | 6.1 |
| Cesium/potassium | 0.054 | 3,900 |
| Cesium/sodium | 0.26 | 450 |
| Cesium/lithium | 10 | >19,000 |

Even more effective separation could, of course, be obtained by increasing the number of scrub stages or by changing the process conditions, e.g., pH.

EXAMPLE X

This example illustrates use of the phenol extraction process for recovering and purifying cesium from pollucite ore, a principal source of natural cesium. The pollucite ore sample analyzed 22.9% Cs, 0.64% Rb, 0.98% K, 1.45% Na, 0.21% Li, 17.5% $Al_2O_3$, and 48.5% $SiO_2$. A mixture consisting of 10 grams pollucite ore, 30 grams of $Ca(OH)_2$, and 10 grams of $CaCl_2$ was roasted for 3 hours at 850° C. The calcined material was cooled, leached with hot water, filtered, and washed. The filtrate after dilution to 100 ml. analyzed 14.4 grams of cesium per liter. The pH of the prepared solution was 11.9. Since adjustment of this solution with caustic to a higher pH level precipitated $Ca(OH)_2$ due to the presence of dissolved calcium chloride, the calcium was removed prior to pH adjustment by precipitating it as calcium carbonate with a 1 M solution of sodium carbonate. The filtrate was then adjusted to pH 13 with caustic. The adjusted solution, which contained 8.4 grams of cesium per liter, was batch-contacted with successive increments of solvent consisting of 1 M 4-sec-butyl-2-(alpha methylbenzyl) phenol in diisopropylbenzene until the cesium concentration in the aqueous phase was reduced to 0.5 grams per liter corresponding to a cesium recovery of 94.5%. Complete recovery could, of course, have been obtained by changing the process conditions, e.g., phase ratio, number of contacts, etc. The first organic increment (containing ~17 grams of cesium per liter) corresponds to the extract that would be removed from the top stage of a countercurrent extraction system. This organic solution was scrubbed with 0.1 M NaOH at an organic/aqueous ratio of 2.5/1 and stripped completely of its cesium content by contact with an equal volume of 0.2 M $HNO_3$. The product strip solution contained 13 grams of cesium per liter. Separation of cesium from other alkali metals was highly efficient as shown by the data in Table X below.

Table X

| Ratio | Separation factor Cs/M[1] | Strip product solution |
|---|---|---|
| Cesium/rubidium | 27 | 795 |
| Cesium/potassium | 13 | 6,350 |
| Cesium/sodium | 0.44 | 1,060 |
| Cesium/lithium | 115 | 250,000 |

[1] M=Ru, K, Na or Li.

It will thus be seen that we have defined a useful class of phenol extractants of particular utility in separating cesium from aqueous radioactive waste solutions produced from solvent extraction processes designed to effect separation and purification of uranium and plutonium therefrom. Moreover, we have defined the operational limits within which the process of this invention may be successfully practiced. Nor is this invention limited to the separation and recovery of cesium from radioactive waste solutions, as exemplified by the aqueous raffinates of the Purex type, for it will be equally evident that this invention is applicable to separation, recovery and purification of cesium from its mineral sources or from any basic cesium-containing solution.

Having thus described our invention, we claim:

1. A method of recovering cesium from an aqueous basic solution which comprises extracting the cesium with an aqueous immiscible organic solvent phase consisting of a phenol selected from an orthophenyl phenol, an orthobenzyl phenol, and a para substituted alkyl phenol wherein the alkyl substitutent contains from 9-20 carbon atoms, dissolved in an organic diluent to the extent of at least about 0.5 molar, and recovering the cesium from the organic solvent phase.

2. A method of recovering cesium from an aqueous basic solution which comprises extracting the cesium from said solution with an aqueous immiscible organic solvent phase consisting of an orthobenzyl phenol dissolved in an organic diluent to the extent of at least about 0.5 molar, and recovering the cesium from the organic solvent phase.

3. A method of recovering cesium from an aqueous basic solution which comprises extracting the cesium from said solution with an aqueous immiscible organic solvent phase consisting of 4-sec-butyl-2-(alpha methyl benzyl) phenol dissolved in an organic diluent to the extent of at least about 0.5 molar, and recovering the cesium from the organic solvent phase.

4. A method of recovering cesium from an aqueous basic solution which comprises extracting the cesium from said solution with an aqueous immiscible organic solvent phase consisting of an orthophenyl phenol dissolved in an organic diluent to the extent of at least about 0.5 molar, and recovering the cesium from the organic solvent phase.

5. A method of recovering cesium from an aqueous basic solution which comprises extracting the cesium from said solution with an aqueous immiscible organic solvent phase consisting of a para-substituted alkyl phenol dissolved in an organic diluent to the extent of at least about 0.5 molar, and recovering the cesium from the organic solvent phase.

6. A method of recovering cesium from an aqueous basic solution which comprises extracting the cesium from said solution with an aqueous immiscible organic solvent phase consisting of a paradodecyl phenol dissolved in an organic diluent to the extent of at least about 0.5 molar, and recovering the cesium from the organic solvent phase.

7. A method of recovering cesium from an aqueous basic solution which comprises extracting the cesium with an aqueous immiscible organic solvent phase consisting of a phenol selected from an orthophenyl phenol, an orthobenzyl phenol and a para-substituted alkyl phenol wherein the alkyl substituent contains from 9-20 carbon atoms dissolved in an organic diluent to the extent of at least about 0.5 molar, said organic solvent phase being further characterized in that the pH resulting aqueous phase after extraction of said cesium therefrom is basic.

8. A method of recovering cesium from an aqueous basic solution which comprises extracting the cesium in a countercurrent multistage extraction system with an aqueous immiscible organic solvent phase consisting of a phenol selected from an orthophenyl phenol, an orthobenzyl phenol, and a para-substituted alkyl phenol wherein the alkyl substituent contains from 9-20 carbon atoms dissolved in an organic diluent to the extent of at least 0.5 molar, adding acid to the cesium depleted aqueous solution in said extraction system to regenerate the selected free phenol from any aqueous-soluble phenol values, recycling said regenerated free phenol to said organic solvent phase, and recovering the cesium from the said organic solvent phase.

9. A method of recovering cesium from an aqueous basic feed solution which comprises extracting the cesium in a countercurrent multistage extraction system with an aqueous immiscible organic solvent phase consisting of a phenol selected from an orthophenyl phenol, and orthobenzyl phenol, and a para-substituted alkyl phenol wherein the alkyl substituent contains from 9-20 carbon atoms, dissolved in an organic diluent to the extent of at least 0.5 molar, adding acid to the cesium depleted aqueous solution in said system to regenerate the selected phenol from any aqueous soluble phenolate, recycling said regenerated phenol to said organic solvent phase, scrubbing the cesium-containing organic solvent phase after extraction from said aqueous feed solution with a dilute aqueous basic scrub solution, recycling the spent scrub solution to join the aqueous feed in said system, and recovering the cesium from the organic solvent phase.

References Cited by the Examiner

UNITED STATES PATENTS

| | | | |
|---|---|---|---|
| 2,110,074 | 7/35 | Arnold | 252—106 |
| 2,561,862 | 7/51 | Hill | 75—101 |
| 2,659,656 | 11/53 | Berner | 75—121 |
| 2,670,383 | 2/54 | Beaver | 252—106 |
| 2,925,323 | 2/60 | Rimshaw | 23—25 |

OTHER REFERENCES

"Handbook of Chemistry and Physics," 39 ed., 1958, p. 1102.

NORMAN YUDKOFF, *Primary Examiner.*